United States Patent [19]
Chronister

[11] Patent Number: 5,145,151
[45] Date of Patent: Sep. 8, 1992

[54] INTERNAL TANK VALVE WITH VALVE LOCK

[76] Inventor: Clyde H. Chronister, 6115 Bermuda Dunes, Houston, Tex. 77069

[21] Appl. No.: 822,238

[22] Filed: Jan. 17, 1992

[51] Int. Cl.⁵ .............................................. F16K 51/00
[52] U.S. Cl. .................................... 251/144; 251/91;
    251/95; 137/316; 137/382; 137/797
[58] Field of Search ................ 251/89, 91, 92, 95,
    251/144; 137/316, 383, 382, 382.5, 797

[56] References Cited
U.S. PATENT DOCUMENTS

| | | | |
|---|---|---|---|
| 3,981,481 | 9/1976 | Reedy et al. | 251/144 |
| 4,121,614 | 10/1978 | Reedy | 251/144 |
| 4,161,958 | 7/1979 | Behle | 137/316 |
| 4,194,523 | 3/1980 | Lubieniecki | 251/144 |
| 4,220,097 | 9/1980 | Wempe et al. | 137/382 |
| 4,440,379 | 4/1984 | Behle et al. | 251/144 |
| 5,042,776 | 8/1991 | Chronister | 251/144 |

FOREIGN PATENT DOCUMENTS 2258136  7/1973  Fed. Rep. of Germany ........ 251/95

Primary Examiner—A. Michael Chambers
Attorney, Agent, or Firm—Fulbright & Jaworski

[57] ABSTRACT

An internal valve for a mobile tank car having an opening with a valve seat positioned in the opening. A sealing valve element is positioned in the tank for coacting with the valve seat for opening and closing the valve. A disc valve is releasably connected about the passageway below the valve element. A stem sealingly extends through the cap and is engagable with the valve element when the valve element is in the closed position. An actuator is connected to the stem outside of the cap for actuating the stem and locking the valve element in the closed position. A secondary seal may be actuated by the stem.

8 Claims, 2 Drawing Sheets

INTERNAL TANK VALVE WITH VALVE LOCK

BACKGROUND OF THE INVENTION

The present invention is directed to an internal valve for use in a mobile tank car for locking the valve in a closed position to provide a positive seal, a fire safe valve and prevent spillage of the material inside of the tank in the event of an accident. Additionally, the valve of the present invention may provide a secondary seal.

It is known as described in U.S. Pat. No. 5,042,776 to provide a valve that can be used for loading or unloading mobile tanks, such as railroad tank cars or tank trucks or other types of tanks handling liquids, gases or slurries. Such a valve is positioned internally of the tank and therefore is less subject to being damaged. Such an internal valve may be conveniently installed from the exterior, easily removed for repair or replacement.

However, railroad tank cars and truck tanks are notoriously subjected to vibrations and shocks. In order to increase the safety factor the present invention provides an internal tank valve having a primary seal which can be more securely locked in the closed position to assure a positive seal, a fire safe valve, and reduce the likelihood of spillage of material from inside of the tank in the event of a derailment or accident of the tank car. And of course such locking structure must be provided at a location where it is less likely to be damaged.

SUMMARY

The present invention is directed to an internal valve for a mobile tank car having an opening and a valve seat having a passageway supported from the tank and positioned in the tank opening. A sealing valve element is positioned in the tank for coacting with the valve seat for opening and closing the passageway. A disc valve cap is releasably connected about the passageway below the valve element for releasably closing the passageway. A stem sealingly extends through the cap and it is engagable with the valve element when the valve element is in the closed position. Means are connected to the stem outside of the cap for actuating the stem and locking the valve element in the closed position.

Still a further object of the present invention is the provision of a shoulder around the passageway and a sealing disc sealingly engaging the stem and sealingly engaging the shoulder providing a secondary seal.

Still a further object of the present invention is the provision of locking means on the stem for locking the seal disc against the shoulder for providing a dual locking valve. Preferably the locking means includes a tool engaging surface for actuation of the stem in the event that the stem is broken.

Still a further object of the present invention is the provision of a break away groove in the stem below the locking means for allowing the valve to be held in a closed positive sealing position in the event of an accident in which the cap may be sheared off.

Yet a still further object of the present invention is the provision of resilient means between the locking means and the seal disc for providing a seal which is allowed to withstand shocks and vibrations.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
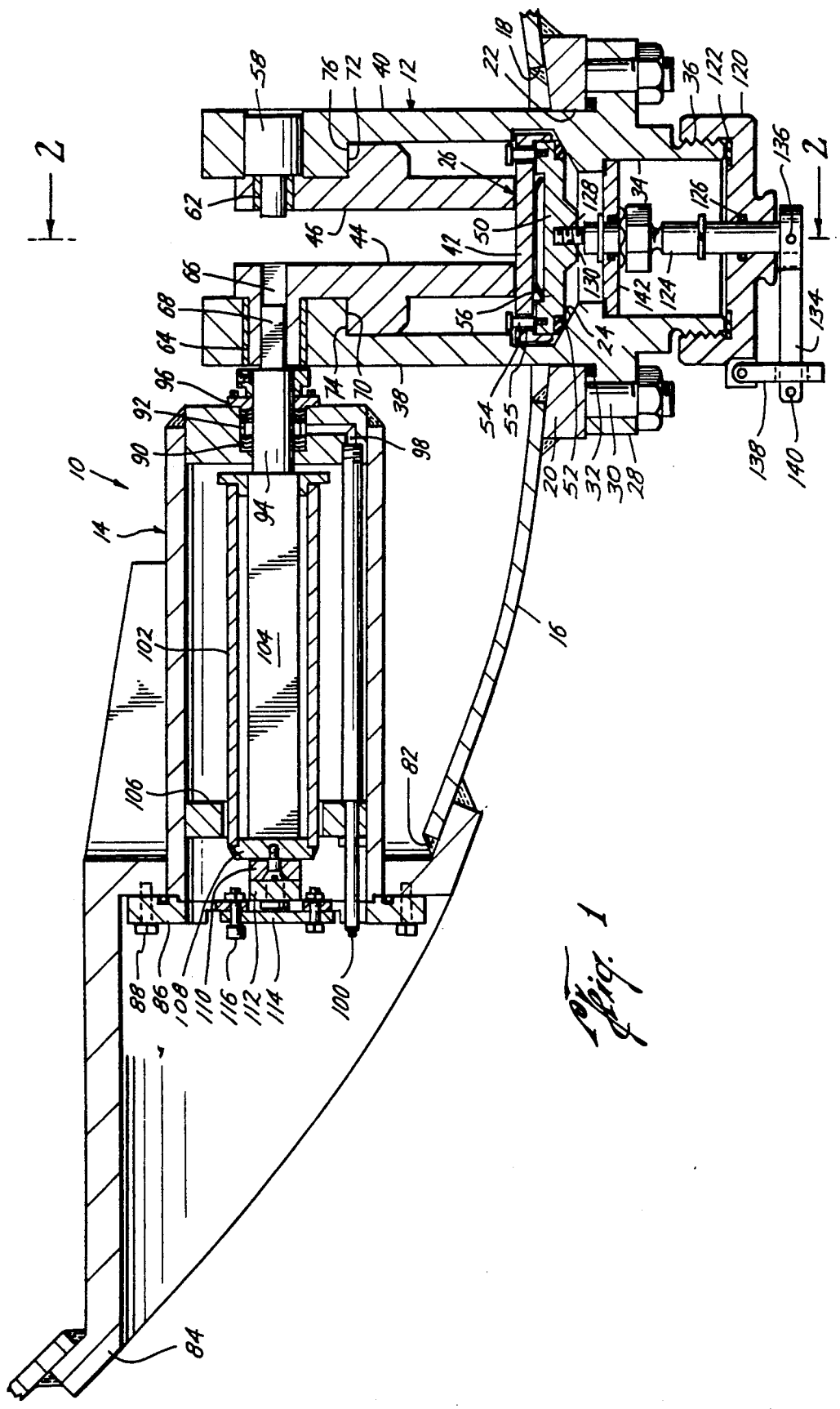
FIG. 1 is an elevational view, in cross section, illustrating the present invention.

While all the improved valve locking and sealing improvement of the present invention may be used with other types of internal tank valves, it will be shown, for purposes of illustration only, as used in combination with the internal tank valve shown and described in U.S. Pat. No. 5,042,776, which is incorporated herein by reference.

Referring now to the drawings, the reference numeral 10 generally indicates the internal tank valve of the present invention and generally includes a main valve body generally indicated by the reference numeral 12, and a valve operator generally indicated by the reference numeral 14. The valve 10 is adapted to be installed inside of a tank 16, for example, a railroad tank car that is approximately eighty-six inches in diameter. However, the present internal valve 10 can be installed on other and various types of tanks of various sizes. In addition, the valve 10 may be installed and repaired from the exterior of new or used tanks easily, quickly and can be adapted for various sized tank openings.

A hole 18 is cut in the tank 16, or an existing hole is used, large enough for the main valve body 12 to be installed. A tank flange 20 is welded to the exterior of the tank 16 and provides a main valve body receiving hole 22 for allowing the insertion and removal of the main body 12. The main valve body 12 includes a valve seat 24 and a sealing valve element 26. A valve flange 28 connected to the valve seat 24 is attached to the tank flange 20 by a plurality of studs 30 and a seal 32 is provided between the valve flange 28 and tank flange 20. The valve seat 24 also includes a passageway 34 which may have a suitable connection such as a threaded connection, either male or female, here shown as male threads 36 for connection to a conduit for supplying fluid to or from the tank 16. The valve seat 24 also includes a first 38 and a second 40 stationary spaced arms extending into the interior of the tank 16.

The sealing valve element 26 includes a holder 42, which is connected to a third 44 and a fourth movable arm 46 which are in turn pivotally connected to the first arm 38 and the second arm 40, respectively. The sealing valve element 26 also includes a sealing disc 50 having a seat seal 52 for coacting with the valve seat 24. Preferably, the sealing disc 50 is loosely carried from the holder 42 by a plurality of bolts 54 positioned in oversized holes 55 in the holder 42 which allow a small amount of movement in all directions between the disc 50 and the holder 42. Suitable biasing means such as a bellville spring 56 is provided between the holder 42 and the disc 50, for yieldably urging the disc 50 onto the valve seat 24. Thus, the sealing disc 50 is not held rigidly against the valve seat, but is allowed to withstand shocks and vibration while still maintaining a closed position due to the action of the spring 56 and/or the action of the material in the tank acting against the back side of the disc 50. Preferably, the sealing disc 50 is a section of a sphere with the resilient seal 52 acting as the primary seal and the metal disc 50 providing a secondary metal-to-metal seal. The disc 50 may be operated with a low torque as compared with a ball valve because there is less area to resist movement through the product in the tank 16.

A trunnion 58 is provided in the arm 40 having a round pivot 60 connected to a bearing 62 in the arm 46 for allowing rotational movement of the arm 46 relative to the arm 40. A bearing 64 is provided between the arms 38 and 44 for allowing rotation between the sealing valve element 26 and the valve seat 24. However, the arm 44 includes a non-circular hole 66, such as a square hole into which a coacting square drive 68 of the operator 14 may be slidably installed and engaged. Rotation of the square drive 68 moves the valve element 26 from the closed position shown in FIG. 1 to an open position (not shown). The disc 50 is movable away and toward the valve seat 24.

Figure 3:
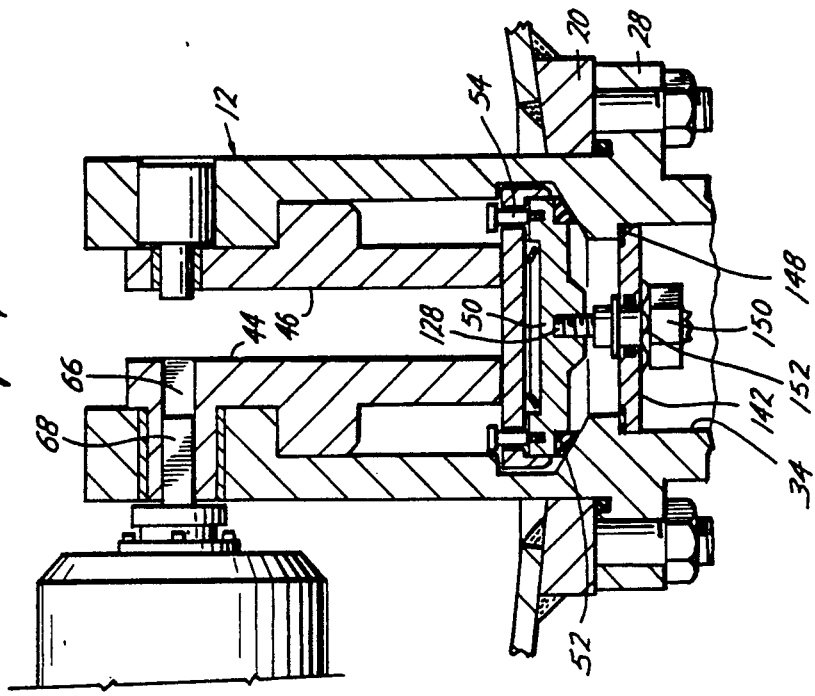
FIG. 3 is a cross sectional view taken along the line 3—3 of FIG. 2 showing the bottom of the valve sheared away.
Figure 2:
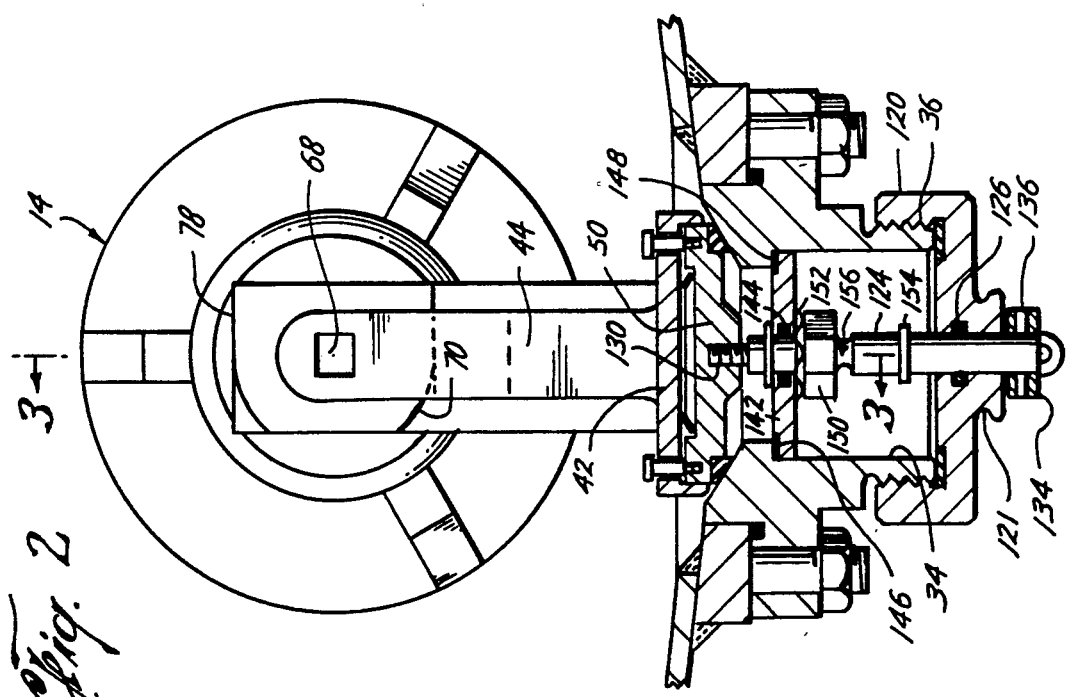
FIG. 2 is a cross sectional view taken along the line 2—2 of FIG. 1 showing the valve end the closed position.

Referring now to FIGS. 1, 2 and 3, coacting open and closed stop shoulders are positioned between the valve seat 24 and the valve element 50. Thus, shoulders 70 and 72 may be provided on the first arm 38 and second arm 40 of the valve seat unit 24 which coact with shoulders 74 and 76 on the arms 38 and 40, respectively, to provide coacting stop shoulders for positioning the valve element 26 in the closed position. When the valve element 26 is moved to the open position, the shoulders 74 and 76 on the arms 44 and 46, respectively, engage shoulders 78 and 80 on arms 38 and 40 respectively, for holding the valve in the open position.

Referring now to FIG. 1, the valve operator 14 is installed in the tank 16 through an opening 82 and supported from a mounting flange 84 which may be welded to the exterior of the tank 16. An operator flange 86 is connected to mounting flange 84 with operator mounting bolts 88. After the main valve body 12 is installed in place through the opening 18, the operator 14 may be installed and it is noted that the longitudinal axis of the valve operator 14 is perpendicular to the longitudinal axis of the main valve body 12 for allowing the square drive 68 to slidably engage and coact with the square opening 66 in the arm 44.

Packing 90 and lantern ring 92 is maintained in place around circular stem 94 by a packing gland 96. A passageway 98 is provided between a head fitting 100 and the lantern ring 92 for providing a sealant if desired.

A stem extension 102 is telescopically positioned on the stem drive 104 which has a round sectional area with a flat surface on the top and bottom. The stem extension 102 may move outwardly or inwardly on the stem drive 104 to lengthen the valve operator to provide enough clearance to rotate the square drive 68 from outside of the tank 16. The telescoping stem extension is stopped in its outward position by the extension stop 106. When the extension 102 is pushed inwardly into the non-operating position, it is stopped by the end plate 108 contacting the end of the stem drive 104.

Referring now to FIG. 1, an operator handle 110 is attached to the end Plate 108 of the telescoping stem body 102. An operator handle extension 112 is attached to the handle 110 by a hinge pin so that the handle extension 112 may be extended for manually rotating and operating the operator 14, but can be folded over for storage in a non-operating position. The entire operator 14 may be placed in a non-operating position by a lock lever 114 and by a lever locking nut 116. The locking lever 114 is free to move around in pin 118 into a locked and unlocked position.

In operation, openings 18 and 82 may be made in the tank 16, and the main valve unit 12 is first installed. Thereafter, the operator 14 is installed with the square drive 68 slidably engaging the opening 66 in the arm 44. It is noted that both the main body unit 12 and the operator 14 is positioned internally of the tank 16 and protected against accidental breakage. When it is desired to move the valve element 26 between an open and closed position, the lock level 114 is unlatched, the stem extension 102 is extended, the operator handle extension 112 is folded outwardly and the operating shaft 104 is manually rotated 180 degrees to move the valve element 26 to the desired position against a stop. Thereafter, the operator is again placed in the retracted position.

The above described internal tank valve is generally described in U.S. Pat. No. 5,042,776.

While the above described valve is satisfactory and has a valve body 12 and operator 14 positioned completely inside of the tank 16 and above the shear point in the event that the railroad tank car goes off of the track, the single and resiliently movable valve seat element disc 50 relative to the valve seat 24 is subject to vibrations and shocks and possible leakage. The present improvement to an internal tank valve provides a locking and hold down apparatus and additional valve seals which performs the function of holding the tank valve in place to assure a positive seal, a fire safe valve and reduces the chance of spillage of the material inside of the tank 16 in the event of a derailment or accident of the car if it is involved in an accident or turns over.

Referring now to FIGS. 1 and 2, a disc valve cap 120 is provided which may be screwed onto and thus releasably connected about the passageway 34 to the threads 36 below the valve element 50 for releasably closing the passageway 34. A suitable seal 122 is provided to sealably close the passageway 34.

A round stem 124 sealably, rotatably and telescopically extends through the cap 120 through a seal 126. The stem 124 includes engagable means such as a threaded bolt 128 for engaging coacting threads 130 in the bottom of the sealing disc 50. Thus, when the valve element 26 is in the closed position, as best seen in FIGS. 1-3, the threaded bolt 128 may be aligned with and screwed into the threaded opening 130 in the disc 50 by rotation of the stem 124.

Means are connected to the stem 124 outside of the cap 120 for actuating the stem 124 and locking the valve element disc 50 in the closed position. Such means may include a handle 134 which is connected to the stem 124 by a pin 136. After the handle 134 is rotated to pull down and lock the disc 50, it may be inserted into a locking link 138 and a lock inserted through hole 140. Thus, the primary resilient seal 52 is pulled tightly downward onto the valve seat 24 and in addition a metal to metal seal is engaged between the disc 50 and the valve seat 24. This will isolate the product in the tank from any fires on the outside of the tank 16.

Preferably, a second disc 142 sealingly surrounds the stem 124 with a seal 144. Downwardly facing shoulder 146 surrounds the passageway 34 and a secondary seal 148 on the disc 142 is arranged to sealingly engage the shoulder 146. That is, locking means are provided on the stem 124 such as a hexagonal surface 150 which is secured to the stem 124. By rotating the stem 124 the disc 50 is pulled down onto the valve seat 24 and the disc 142 is pushed up on the shoulder 146.

Preferably, a wavy spring 152 is positioned between the locking means 150 and the disc 142. Thus, rotation of the handle 134, as best seen in FIGS. 1 and 2 will tighten and lock multiple seals on the valve 10.

The stem 124 may include one or more shear stress grooves such as a groove holding a C ring 154 and/or a groove 156. In the event of a derailment or accident of the tank 16, the cap 120 may be sheared off along with a portion of the stem 124, as best seen in FIG. 3, but still leaving multiple locked seals which are positioned internally of the valve seat thereby preventing spillage of the material inside of the tank 16. Thus, the present improvement will provide multiple positive seals, a fire safe valve and prevent spillage of material from the tank even in the event of an accident.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art and which are encompassed within the spirit of the invention and the scope of the appended claims.

What is claimed is:

1. An internal valve for a mobile tank car having an opening comprising,
    a valve seat having a passageway supported from the tank and positioned in the tank opening;
    a sealing valve element positioned in the tank for coacting with the valve seat for opening and closing said passageway,
    a valve cap releasably connected about the passageway below the valve element for releasably closing the passageway,
    a stem sealingly extending through the cap and threadably engagable with the valve element when the valve element is in the closed position,
    coacting engaging means between the stem and the valve seat for allowing the threadably engaged stem to pull the valve element onto the seat in a closed and locked position when the stem is rotated, and
    means connected to the stem outside of the cap for rotating the stem and locking the valve element in the closed position.

2. The valve of claim 1 including,
    a shoulder around the passageway,
    a seal disc releasably and sealingly engaging the stem, and sealing engaging the shoulder.

3. The valve of claim 2 including releasable locking means on the stem for releasably locking the seal disc against the shoulder.

4. The valve of claim 3 including,
    a break away groove in the stem below the locking means.

5. The valve of claim 3 including,
    resilient means between the locking means and the seal disc.

6. The valve of claim 3 wherein the locking means includes a tool engaging surface for actuation of the stem.

7. The valve of claim 4 wherein the valve seat and the seal disc are positioned above the break away groove.

8. An internal valve for a mobile tank car having an opening comprising,
    a valve seat having a passageway supported from the tank and positioned in the tank opening,
    a sealing valve element positioned in the tank for coacting with the valve seat for opening and closing said passageway,
    a shoulder around said passageway facing away from the valve seat,
    a valve cap releasably connected about the passageway for releasably closing the passageway,
    a stem sealingly extending through the cap and threadably enagable with the valve element when the valve element is in the closed position,
    a seal disc sealingly engaging the stem and positioned between the shoulder and the cap, said seal disc releasably and sealingly engaging the shoulder,
    coacting engaging means between the stem and the disc for pressing the disc against the shoulder as the stem is threadably engaged with the valve element and thereafter pulling the vale element onto the seat in a closed and locked position when the stem is rotated, and
    means connected to the stem outside of the cap for rotating the stem.

* * * * *

UNITED STATES PATENT OFFICE
CERTIFICATE OF CORRECTION

Patent No. 5,145,151                    Dated September 8, 1992

Inventor(s)      Clyde H. Chronister

It is certified that error appears in the above-identified patent and that said Letters Patent is hereby corrected as shown below:

On the Title page, item [57]
  In the ABSTRACT, line 5, after "valve" insert -- cap --

Column 6, delete lines 6 and 7, and insert therefor -- a seal disc sealingly engaging the stem, and
  releasably and sealingly engaging the shoulder. --

Signed and Sealed this

Twenty-eighth Day of September, 1993

Attest:

BRUCE LEHMAN

*Attesting Officer*          *Commissioner of Patents and Trademarks*